United States Patent
Stollon et al.

(10) Patent No.: US 7,886,150 B2
(45) Date of Patent: Feb. 8, 2011

(54) SYSTEM DEBUG AND TRACE SYSTEM AND METHOD, AND APPLICATIONS THEREOF

(75) Inventors: Neal S. Stollon, Dallas, TX (US); Ernest L. Edgar, Larkspur, CO (US)

(73) Assignee: MIPS Technologies, Inc., Sunnyvale, CA (US)

( * ) Notice: Subject to any disclaimer, the term of this patent is extended or adjusted under 35 U.S.C. 154(b) by 929 days.

(21) Appl. No.: 11/747,666

(22) Filed: May 11, 2007

(65) Prior Publication Data

US 2008/0282087 A1    Nov. 13, 2008

(51) Int. Cl.
*H04L 9/00* (2006.01)
*H04L 9/32* (2006.01)
*G06F 11/00* (2006.01)

(52) U.S. Cl. ............... 713/171; 713/169; 713/170; 726/27; 726/28; 726/29; 726/30

(58) Field of Classification Search ............... 713/171
See application file for complete search history.

(56) References Cited

U.S. PATENT DOCUMENTS

| 7,055,070 B1 | 5/2006 | Uhler et al. |
| 7,065,675 B1 | 6/2006 | Thekkath et al. |
| 7,461,407 B2 * | 12/2008 | Little et al. ............ 726/27 |
| 2002/0199110 A1 * | 12/2002 | Kean ............ 713/189 |
| 2007/0239995 A1 * | 10/2007 | Tucker ............ 713/189 |

OTHER PUBLICATIONS

Judd Heape and Neal Stollon, Embedded Logic Analyzer Speeds SoPC Design Exploring the instrumentation-based analysis of an embedded standard product, published Aug./Sep. 2004, Chip Design Magazine available at http://www.chipdesignmag.com/display.php?articleId=75&issueId=6.

Morton Zilmer, "Non-intrusive On-chip Debug Hardware Accelerates Development for MIPS RISC Processors," EE Times, available at http://www.amslink.com/mipsartl.html, Mar. 30, 1999, pp. 1-6.

First Silicon Solutions: Technical Data for ISA-CAST51 In-Target System Analyzer for CAST 8051 Synthesizable Microcontroller Cores, undated.

Morton Zilmer, MIPS tailors debug with on-chip unit, EETimes, Apr. 6, 1999, 3 pages, available at URL: http://www.eetimes.com/showArticle.hjtml?articleID=18301640.

* cited by examiner

*Primary Examiner*—Longbit Chai

(57) ABSTRACT

An embedded system or system on chip (SoC) includes a secure JTAG system and method to provide secure on-chip control, capture, and export of on chip information in an embedded environment to a probe. In one embodiment, the system comprises encryption logic associated with a JTAG subsystem and decryption logic in the probe for encrypted JTAG read traffic. Inverted encryption/decryption logic provides bi-directional encryption and decryption of JTAG traffic. Encrypted information includes both authentication of valid probe/target interface and encryption of debug data.

19 Claims, 6 Drawing Sheets

SYSTEM DEBUG AND TRACE SYSTEM AND METHOD, AND APPLICATIONS THEREOF

FIELD OF THE INVENTION

The invention relates generally to on-chip testing and debugging, and more specifically to a secure system and method for testing and debugging an embedded system.

DESCRIPTION OF RELATED TECHNOLOGY

With ever increasing performance demands, embedded systems need to integrate more control and data functions onto a single integrated circuit device or chip. Integration provides many advantages for embedded system. These advantages include reduced power and space requirements as well as reduced bill-of-material costs due to the reduced number of discrete components at the system level. Indeed, for an embedded system, a single chip provides better performance and allows tighter integration of data and control functions.

In terms of complexity, embedded systems can range from a very simple single processor device to a device that combines multiple processors with peripherals and network interfaces on single chip. Unfortunately, this complexity makes it difficult to adequately test embedded systems either at the production stage or later when the system is out in the field.

To address these difficulties, designers typically incorporate an on-chip mechanism for testing the device. One such test mechanism utilizes a Joint Test Action Group ("JTAG") test access port ("TAP") as defined in IEEE Standard 1149.1, IEEE Standard Test Access Port and Boundary-Scan Architecture (the "IEEE Standard"), which is incorporated herein by reference in its entirety for all purposes. The JTAG TAP provides an external interface to the chip. According to the standard, each chip includes a TAP and each TAP includes at least three inputs: a test clock ("TCLK"), a test mode select ("TMS"), and a test data in ("TDI") port. The TAP includes at least one output: a test data out ("TDO") port. Data in the form of "test vectors" is serially shifted from the TDI port and into the integrated circuit and serially shifted out of the integrated circuit and onto the TDO port. The chip's operation can be determined by using a commercially available probe coupled to the TAP to write or read these test vectors.

Software debug on complex chips has likewise become increasingly difficult to conduct. In this regard, another on-chip test mechanism, an extension of the JTAG standard, referred to as EJTAG, has been developed. EJTAG is a hardware/software subsystem that provides comprehensive debugging and performance tuning capabilities to processors and to system-on-chip components having processor cores. EJTAG exploits the infrastructure provided by the JTAG standard to provide an external interface, and extends an instruction set of the processor and privileged resource architectures to provide a standard software architecture for integrated system debugging. Using EJTAG, instructions to be executed by the processor, in addition to data, may be downloaded to the processor via the test probe.

While designed primarily for testing and debugging subblocks of a chip, these and other on-chip test mechanisms inherently provides a "back door" into the embedded system. Unfortunately, this back door enables, in theory, access to all internal registers and bus transactions as they occur in the embedded system. For media applications, in particular, this could allow a hacker familiar with a chip's design to access otherwise secured data by, as an example, single stepping and reading registers during a read operation. This is of particular concern to copyright holders who may want to make a DVD and other content-based applications available only in a secure environment.

One current approach to prevent hackers from accessing secured data involves removing the on-chip test mechanism after chip has passed its manufacturing tests. For example, fuses in JTAG bond wires can be blown to prevent easy access to the JTAG logic. Unfortunately, the JTAG logic is still accessible to the sophisticated hacker who can repair or bypass the blown bond wires.

Other approaches to securing the on-chip test mechanism attempt to implement a secure JTAG interface that relies on a handshake or passing of a security code between the chip and a probe or programmer. For example, a probe's serial number is checked to determine if the probe is authorized to control operation of the test mechanism. Unfortunately, this type of approach only addresses enabling the JTAG interface and not the securing of data passing through the JTAG interface. Thus, if the security code is compromised, a hacker would have ready access to control operation of the device and to obtain otherwise secure information.

Still other approaches address security key passing or handshake between a JTAG TAP and probe. Depending on the specific implementation, this type of protection may be defeated by stealing the access code or the probe itself. Further, current technology does not address the issue of protecting data exported via the JTAG port.

What is needed is a system and method for securing both the on-chip test interface in an embedded system and applications thereof as well as the traffic across the interface.

BRIEF SUMMARY OF THE INVENTION

The present invention provides systems and methods for securing the testing and debugging of an embedded system or system on chip (SoC), and applications thereof. In one embodiment, a system and method provide secure on-chip control, capture, and export of on-chip information, often referred to as test vectors, to a probe.

The system comprises encryption logic associated with on-chip test mechanism and decryption logic associated with the probe for decrypting the encrypted test vectors. In another embodiment, the on-chip test mechanism and probe each includes encryption/decryption logic that supports the bi-directional transfer of encrypted traffic between the SoC and the probe. As used herein, traffic refers to test vectors, data and instructions that are executed by the embedded system's processor core as well as the test vectors that are exported from the chip to the probe.

In addition to encrypting the traffic, the present invention further provides a mechanism for authenticating the probe and the user and for unlocking the encryption/decryption logic after authenticating the user and the test mechanism-probe interface. This feature restricts unauthorized access to a functional on-chip test mechanism unless authorized. Further, the present invention minimizes the risk that encrypted on-chip data can be accessed as plain text by utilizing the test logic to read CPU registers during a decryption process unless the user has the appropriate decryption keys.

The method comprises a series of steps that include authentication of the user and the probe used to acquire information from the device as well as encryption of all traffic between the device and the user. The user will be able to use acquired information only if a valid decryption key is known.

Further embodiments, features, and advantages of the present invention, as well as the structure and operation of the various embodiments of the present invention, are described in detail below with reference to the accompanying drawings.

DETAILED DESCRIPTION OF THE INVENTION

A preferred embodiment of the invention is now described with reference to the figures where like reference numbers illustrate like elements. While specific methods and configurations are discussed, it should be understood that this is done for illustration purposes only. A person skilled in the relevant art will recognize that other components, configurations and procedures may be used without departing from the spirit and scope of the invention.

In one embodiment, a system and method provide secure on-chip control, capture, and export of debug and trace information in an embedded environment. An on-chip mechanism provides test, debug and trace information to a test probe. One exemplary test mechanism utilizes a Joint Test Action Group ("JTAG") test access port ("TAP") as defined in IEEE Standard 1149.1, IEEE Standard Test Access Port and Boundary-Scan Architecture (the "IEEE Standard") that is combined with encryption and decryption logic to render traffic unreadable without a special key. In another embodiment, the test mechanism is disabled until the test probe and the user are authenticated. Once authenticated, the test mechanism is enabled but the traffic is encrypted. The combination of security features in the SoC with secure control software work together in new ways against hackers that would otherwise cost businesses significant amounts of revenue from lost sales.

In another embodiment, the system comprises encryption logic associated with a JTAG subsystem and decryption logic in the probe for encrypted JTAG read traffic. Inverted encryption/decryption logic provides bi-directional encryption and decryption of JTAG traffic. Encrypted information includes both authentication of valid probe/target interface and encryption of debug data.

Figure 1:
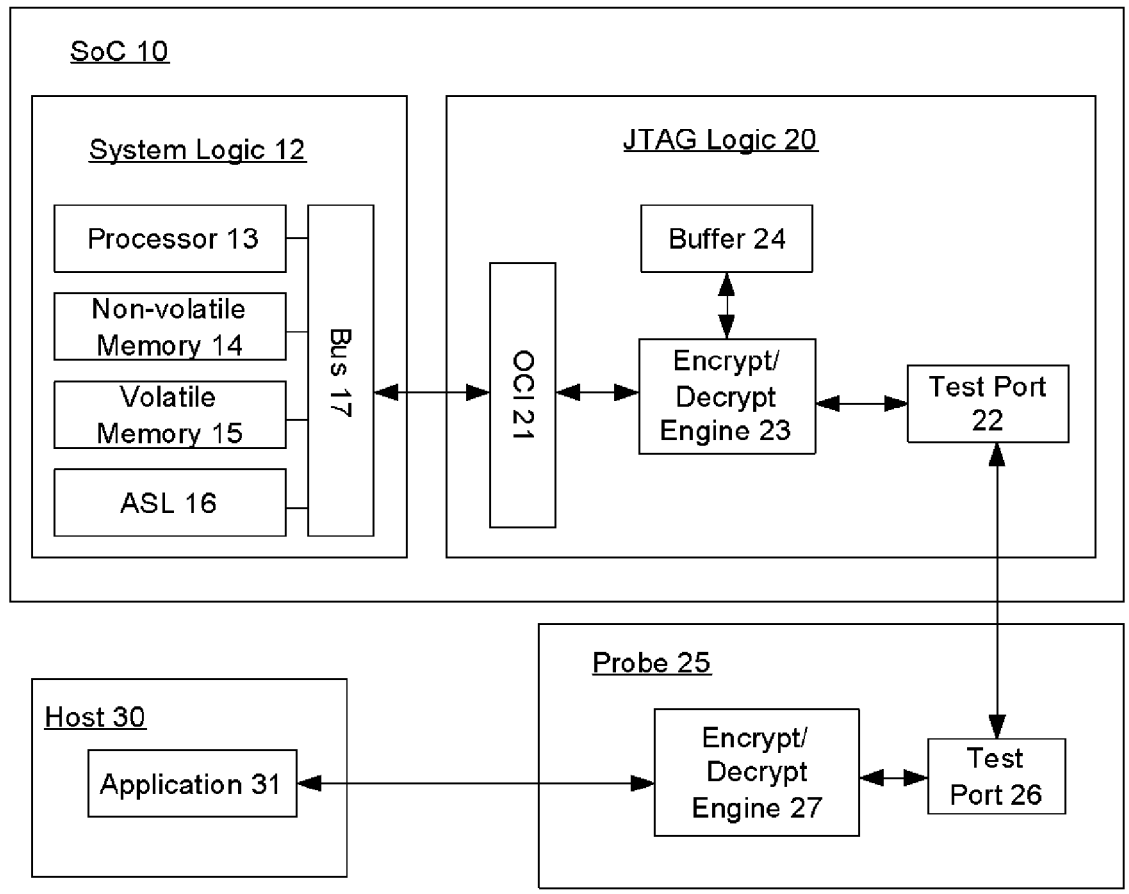
FIG. 1 is a block diagram illustrating a system for securing JTAG communications in an electronic system in accordance with an embodiment of the present invention.

While JTAG provides increased control and flexibility in the tracing and debugging process for hardware, software, and computer engineers to effectively debug the operation of a computer system, it also provides unrestricted access to hackers and potentially exposes protected information. Because many system designers consider the availability of JTAG or EJTAG logic to be indispensable for software development and integration, an embodiment of a debug and tracing system in accordance with the present invention is described below with reference to FIG. 1.

In the illustrated embodiment, an electronic system, such as a system on chip (SoC) 10, includes system logic 12 and secure JTAG logic 20 in accordance with an embodiment of the present invention. System logic 12 includes both software and logic elements that perform selected functions. JTAG logic 20 interfaces with system logic and is often beneficial for hardware debug/bring-up.

The logic elements portion of SoC 10, include a processor core 13 coupled to non-volatile and volatile memory 14 and 15, respectively, and application specific logic 16 by one or more buses 17. As is well understood in the art, software, stored in memories 14 and 15, is executed by processor core 13 to control operation of system logic 12 to provide specific functionality.

Due to the increasing sophistication of debug requirements for highly integrated processor-based SoCs, JTAG logic 20 includes an on-chip instrumentation (OCI) 21 and test port 22. Test port 22 may be, by way of example, a JTAG test access port (TAP), trace port or other test or debug interface. By way of illustration, a JTAG TAP provides an external interface to the chip and includes at least three inputs: a test clock ("TCLK"), a test mode select ("TMS"), and a test data in ("TDI") port. The TAP also includes at least one output: a test data out ("TDO") port. Data is serially shifted from the TDI port and into the SoC and serially shifted out of the SoC and onto the TDO port. "Test vectors" are written to or read from the SoC via a test probe.

JTAG logic further includes circuit elements that encrypt data going from SoC 10 to the probe and host and decrypts traffic received from the host and probe to SoC 10. Encrypting the traffic minimizes the risk that a hacker can use a probe that sends commands to JTAG logic 20 to, for example, instruct processor 13 to transmit plain text out through an unencrypted serial port or other link that is not covered by the encryption system.

While the invention is disclosed in connection with system logic 12 and JTAG logic 20, it should be understood that the reference to processor 13, memories 14 and 15, application specific logic 16 and buses 17 and JTAG logic 20 are intended to be representative of an exemplary SoC. Thus, for example, processor 13 may refer to a traditional processor or to multiple processor cores and, although not specifically shown in the figure, the SoC may include other specific logic elements, such as graphic processors, video engines, memory controllers, analog circuit elements, digital signal processors and the like. The non-volatile memory 14 may be Flash memory, RAM with a battery backup, an optical memory or a magnetic medium storage medium such as MRAM. Further, more robust EJTAG logic may replace the JTAG logic 20. Similarly, the exemplary JTAG logic may, in other embodiments, refer to other trace or debug logic. Further, a person skilled in the relevant art will recognize that the invention is not limited to the SoC or JTAG logic described in this example environment and after reading the following description, it will become apparent how to implement the invention in alternative environments.

To illustrate the operation of SoC 10, consider the possibility of system logic 12 fully configured with secured data contained in its memory 15. At some point, the processor will access and decrypt the secured data in the course of executing selected functions. For example, the processor could decrypt a movie (stored in memory in encrypted form) for viewing on a display such as a high definition television. During the decryption process, registers utilized by processor 13 will temporarily hold the plain text of the movie prior to display. Because JTAG logic 20 provides a backdoor into system logic 12, a hacker familiar with the SoC's design and JTAG programming could access this otherwise secured data by, for example, single stepping and reading the registers to defeat the encryption protection. Understandably, this backdoor vulnerability that exposes the plain text content of the movie is of particular concern to content providers.

To minimize the backdoor vulnerability, an encryption/decryption engine 23 interposed between OCI 21 and test port 22. Engine 23 prevents unauthorized access to internal registers while retaining the advantages provided by on-chip trace and debug logic. Encryption/decryption engine 23 encrypts traffic received from OCI 21 and decrypts traffic received by test port 22. A dedicated buffer memory 24 is included as part of JTAG logic 20 for temporary store of trace and debug data to compensate for any latency introduced by the encryption/decryption process.

Buffer 24 may be utilized differently depending on the cipher algorithm employed by SoC 10. For example, if the cipher encrypts cipher blocks, plain text traffic is accumulated in buffer 24 prior to the encryption or decryption. If the cipher operates on a continuous stream, encrypted traffic may be stored in buffer 24. If the employed cipher algorithm operates on a continuous stream of traffic and the encrypted traffic is stored in buffer 24 until bandwidth is available to transfer the encrypted traffic off-chip. Commands provided to JTAG logic 20 may request processor 13 to allocate addition buffer space in volatile memory 15. This additional buffer space may be required, for example, if debug and trace data accumulate at a rate that is faster than the encryption rate of the encryption engine. One skilled in the art will appreciate that such allocation may be either dynamic or static depending on the design requirements for a given application. In other embodiments, JTAG logic 20 uses a dedicated portion of memory 15 as an overflow buffer thereby eliminating the need for buffer 24.

As is appreciated in the art, a common key may be used for both the encryption and the decryption algorithm (symmetric key algorithm). If the algorithm is symmetric, the key is known to both the SoC engine 23 and the probe engine 27.

In other embodiments, a different key is used for each algorithm (asymmetric key algorithm). If the algorithm is an asymmetric one, the encyphering key is different from, but closely related to, the decyphering key. If one key cannot be deduced from the other, the asymmetric key algorithm has the public/private key property and one of the keys may be a "public" key without loss of confidentiality. As used herein, the public key is associated with either a plurality of probes while the SoC retains a private key or with a plurality of SoC with a private key assigned to each probe. To decode an encrypted message, the encryption/decryption engines use both the public key and the private key. Preferably, the public key changes on a periodic basis with new keys distributed or generated by a secure source.

It will be appreciated by one skilled in the relevant art that the key values used in the encryption and authentication process can be of arbitrary length, such as by way of example, 128 bits. Further, one or more of the keys may be based on a serial number or other device identifying information. For example, a key may be based on an embedded ID of the probe or a disk drive where the application software 31 is stored.

It is to be understood that the present invention is encryption algorithm agnostic. Thus, any appropriate encryption algorithm such as Advanced Encryption Standard (AES), Data Encryption Standard (DES), triple DES, hash and signature algorithms, key exchange protocols or other suitable public/private key encryption protocols or ciphers may be implemented in conjunction with the present invention.

Encryption and decryption keys, S-tables, blinding tables and other temporary storage requirements for implementing the encryption/decryption process may be stored in a portion of buffer memory 24 or in memories 14 and/or 15 as may be dictated by system design considerations. The encryption key, the decryption key or both may be temporal in nature and expire after a specified amount of elapsed time. With temporal keys, the requesting party is authenticated on a periodic basis each time they attempt to obtain a new key to access JTAG logic 20.

Encrypted trace and debug data passes from test port 22 to a corresponding test port 26 on a probe 25. At probe 25, encryption/decryption engine 27 decrypts the encrypted data and passes the plain text traffic to host 30. At host system 30, software application 31 converts the unencrypted debug and trace information into a human viewable format. Traffic in the opposite direction, received from application 31, is encrypted by engine 27 at probe 25. The encrypted traffic is then sent from test port 26 to encryption/decryption engine 23 through test port 22. The encrypted information is decrypted by before it is passed to OCI 21. Buffer 24 may be used to store both encrypted information if the transfer rate is faster than the decryption rate as well as decrypted information before it is sent on to OCI 21.

In addition to debug and trace information and control instructions, encrypted traffic between JTAG logic 20 and probe 25 can also include the exchange of information for verifying the validity of the probe/target interface. This authentication process may include the use of a digital signature to initiate operation of OCI 21, digital locks or other secure handshake information that unlocks or enables operation of OCI 21. Note that this authentication does not address the issue of exporting protected traffic via test port 22 but rather is an optional initial step that can be implemented before the JTAG logic 20 is operational in various embodiments.

The probe, in one embodiment, includes a time based, limited duration licensing key. Thus, the probe periodically obtains a new key from host 30 before it can generate future signatures. The SoC uses the key provided by the probe to unlock and provide full functionality of the JTAG logic 20.

Once the probe has verified its identity to JTAG logic 20, for embodiments where this feature is implemented, the probe and SoC can exchange encrypted traffic comprising commands and data. Because JTAG logic 20 transmits encrypted debug data or trace information to probe 25, this information will remain encrypted unless probe 25 supports the proper encryption protocol and has a valid de-encryption key. A would-be hacker would have to break or steal three different keys (probe license key, JTAG public key and probe public key) before it would be able to recover plain text from SoC 10. This would be extremely difficult to do on a consistent basis due to the time limited duration of the probe license key. Similarly, since the probe transmits its commands and data in encrypted form, it will be difficult for a hacker to hijack the JTAG logic 20 by issuing rogue commands. Thus, the user must possess a valid key before JTAG logic 20 can recover and execute commands sent by probe 25. The on-chip encryption/decryption engine 23 handles the decryption process for the encrypted traffic. Note that the combination of authentication and encryption provides a layered environment of protection that is not readily defeated by stealing a key, a probe or both.

When probe 25 receives encrypted traffic from SoC 10, encryption/decryption engine 27 may handle the decryption process or the probe 25 may merely pass the encrypted traffic to host 30 for decryption depending upon the configuration specified by application 31.

In one embodiment, JTAG logic 20 performs an additional encryption process to double encrypt outgoing traffic. In a first pass through the encryption engine, the debug and trace information is encrypted using the JTAG logic's private key. The second pass through the encryption engine uses a key that interleaves information such as a probe ID or a hard disk drive associated with host 30.

At the receiving side, probe 25 decrypts the traffic to remove the second level of encryption. The traffic, however, remains encrypted and plaintext is recovered only after the host decrypts the traffic to remove the first level of encryption. This double encryption is particularly effective in preventing access by unauthorized probes. The user will be able to view the plain text debug data and trace information only after decryption of the first encryption level. As noted above, probe 25 utilizes a time based key that is updated on a regular basis such as daily, weekly, or other selected time interval. When double encryption is selected, the software would likewise also utilize a time based key that would only be useful for a limited duration of time.

Figure 2:
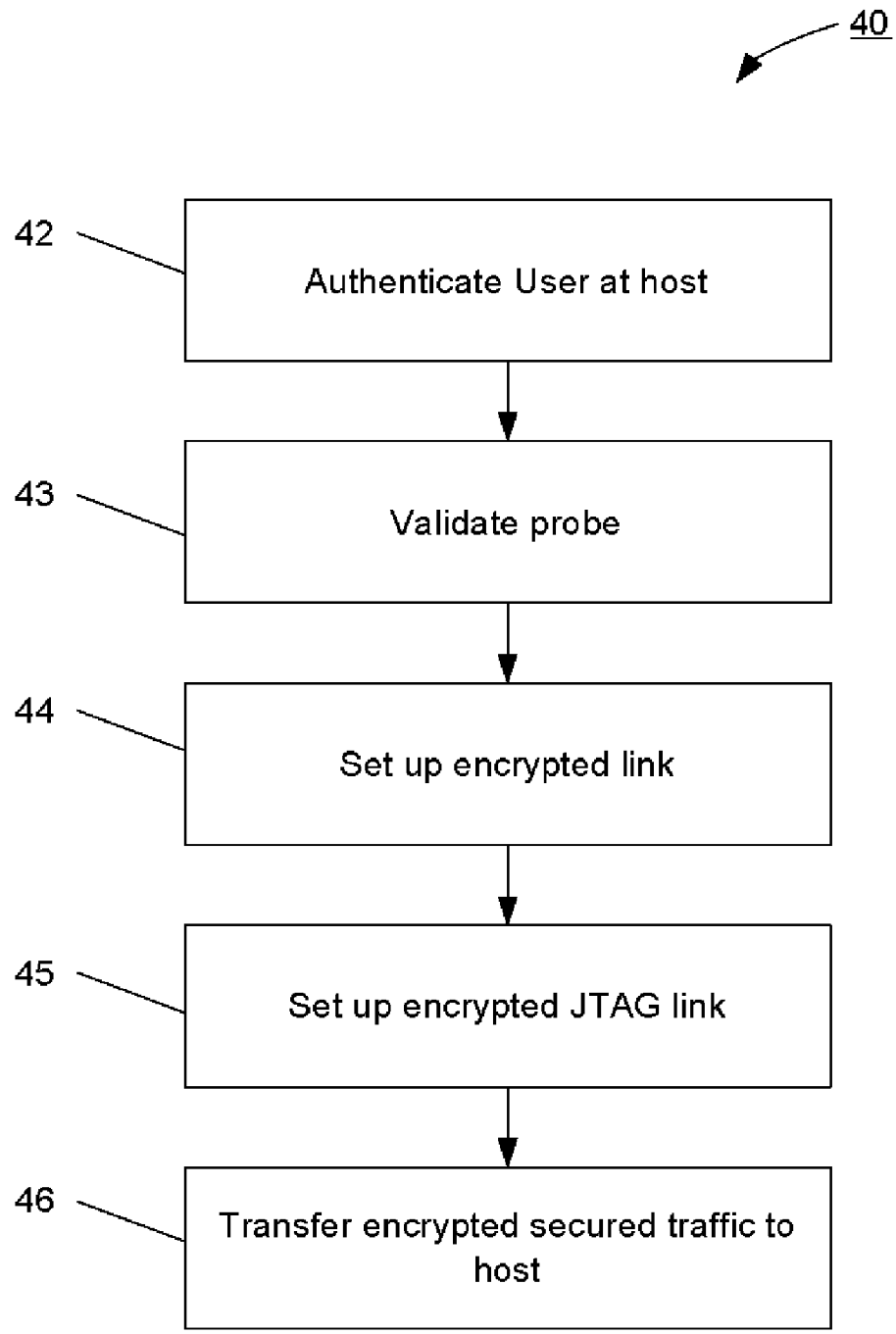
FIG. 2 illustrates a method for secure JTAG communications in an integrated circuit device in accordance with an embodiment of the present invention.

FIG. 2 illustrates a method 40 for securing JTAG communications in an integrated circuit device in accordance with an embodiment of the present invention. At 42, a user is authenticated at host 30 by entering user identification information and a valid password. Once authenticated, the user is provided access to application software 31. At 43, application software 31 validates the integrity of the probe either by downloading a license key to the probe to unlock probe software or by simply reading the probe's serial number and comparing that number to an expected serial number. Once the validation is completed, an encrypted link is established between the probe and the host. At 44, the user specifies, using application software 31, whether traffic between the probe and the host will be encrypted traffic or plain text with the default being encrypted traffic. If encrypted, the probe and the host initiate a handshake sequence to establish a secured transmission link. Subsequently, as indicated at 45, the probe initiates a handshake sequence to establish a secured transmission link with SoC 10. As used herein, a secured transmission link refers to a link where both sides of the link have authenticated the other side as a trustworthy entity and encryption protocols are established. As indicated at 46, traffic is encrypted by the encryption/decryption engine at a source, which may be the JTAG logic 20, host 30 or probe 25, and decrypted by the encryption/decryption engine at a receiver, which may be the probe 25, host 30 or the JTAG logic 20. If the appropriate keys and authentication information is provided, JTAG 20 may be configured to provide plain text rather than encrypted traffic. Note that the encryption keys may be a time limited encryption key is used to frustrate a hacker who possesses a stolen probe.

Figure 3:
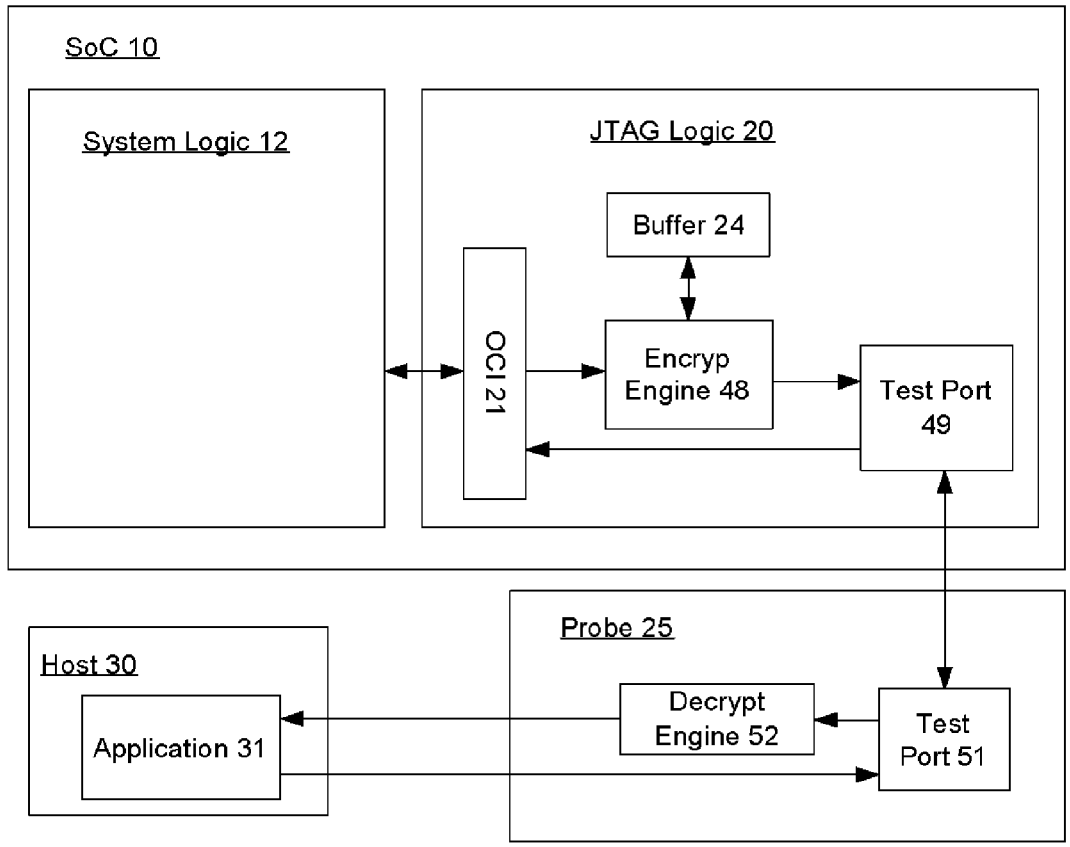
FIG. 3 is a block diagram illustrating another system for securing JTAG communications from an integrated circuit device in accordance with an embodiment of the present invention.

Refer now to FIG. 3, which illustrates an embodiment of the present invention where traffic between JTAG logic 20 and probe 25 is encrypted in at least one direction. Encryption engine 48 encrypts traffic received from OCI 21 before transmission to probe 25 but traffic from probe 25 is received at test port 49 in plain text. When test port 49 receives traffic from probe 25, it is routed from test port 49 directly to OCI 21. Accordingly, there is no required on-chip decryption process since only outbound traffic is encrypted. While less secure than other embodiments, transmitting JTAG commands to SoC 10 in plain text is appropriate in many applications where improved response time and a smaller logic footprint for engine 48 may be appropriate.

Traffic received from SoC 10 may be converted to plain text transmission at probe 25 with full duplex plain text transmission between probe 25 and host 30. In such instances, test port 51 routes traffic from JTAG logic 20 to decryption engine 52. However, traffic to the JTAG logic is routed to test port 51 without any encryption. Plain text transmission may be appropriate in controlled situations where security considerations are satisfied, such as in a manufacturing test environment.

Accordingly, this embodiment of the present invention provides for control, capture and export of encrypted on-chip information in an SoC environment to a probe. The security consists of two levels, encryption of JTAG traffic in combination with securing the probe and probe software to target interface. Traffic encryption consists of encryption logic inserted in the JTAG block subsystem (this may be programmable or fixed), and a decryption block in the probe block for receiving and for and decrypting the encrypted JTAG read traffic. Alternately, encrypted traffic is passed directly to the host for decryption.

Figure 4:
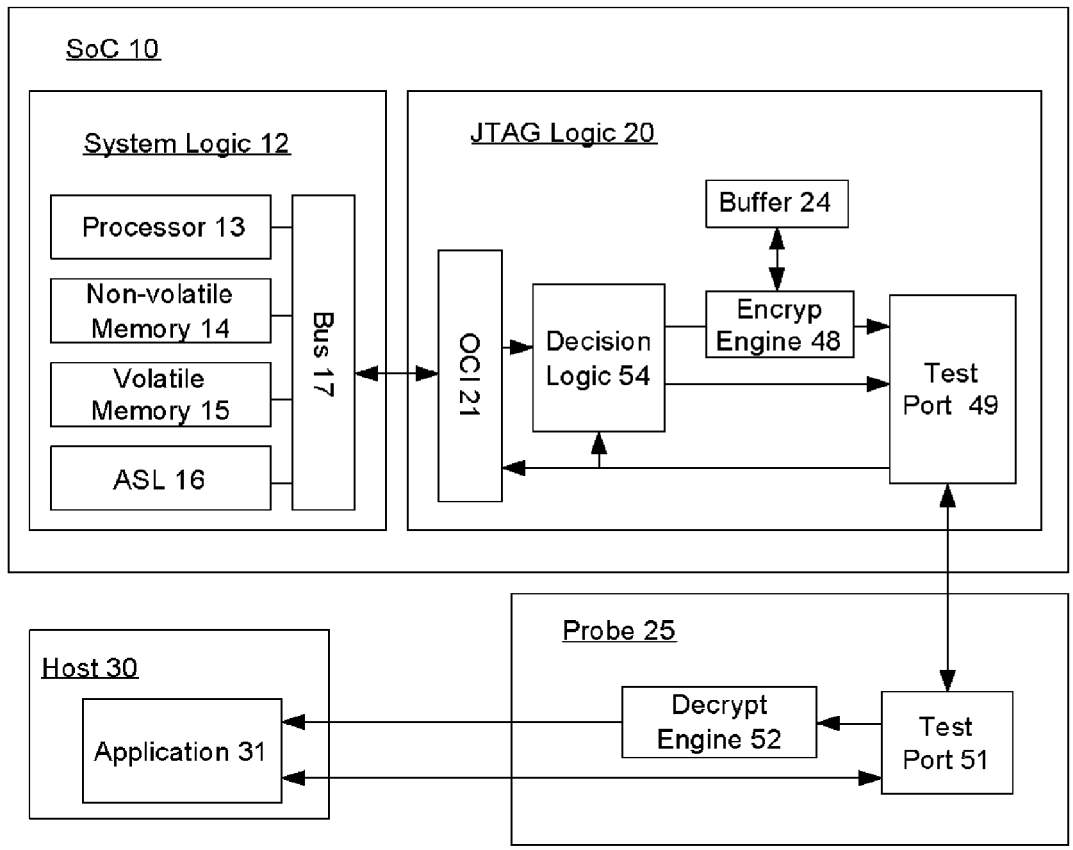
FIG. 4 is a block diagram illustrating another system for selectively securing JTAG communications from an integrated circuit device in accordance with an embodiment of the present invention.

FIG. 4 illustrates another embodiment of the present invention that selectively encrypts traffic from the SoC before it is sent to probe 25. Decision logic 54 determines if the encryption process occurs. If the encryption option is selected, traffic originating from system logic is encrypted by encryption engine 48. Decision logic enables selective encryption on the fly with some data being encrypted and some data being plain text.

Decision logic 54 comprises, in one embodiment, a lockable switch that permits transmission of plain text debug data and trace information at, for example, the final manufacturing test, and then encrypts all transmissions thereafter. One mechanism for locking decision logic 54 is to blow a fusible link that controls the select input to a dual output de-multiplexer after completion of the final manufacturing test. In other embodiments, an encrypted JTAG command can be sent from application 31 to JTAG logic 20, after the above described authentication process and key exchange has completed. The command would provide the key information that would enable a digital lock to temporarily configure the decision logic 54 to allow plain text transmission from SoC 10. Thus, in a controlled environment, encryption engine 48 may selectively send traffic between JTAG logic 20 and host 30 in either encrypted or plain text form.

In some circumstances, it may be desirable to transmit plain text traffic between JTAG logic 20 and system logic 12. However, it should be recognized that the transfer of plain text traffic may render the contents of the processor registers visible to hackers who are familiar with using passive side channel analysis of power profile during operation of the SoC. Accordingly, it is preferred that any transfer of data to JTAG logic 20 be randomly acquired (i.e., processor registers are read in random order or blinded by performing a logical operation before transmission to JTAG logic 20. Further, if the encryption/decryption engine uses memory 15 to store plain text information, that information may be visible when transported on bus 17. Accordingly, internal traffic stored in a main buffer memory is preferably in encrypted form.

In one embodiment, encrypted traffic may be temporarily stored in a buffer such as memory 15. Thus, after encryption by engine 48, port 49 directs the encrypted traffic to OCI 21 for temporary storage in memory 15. Once port 49 has established the secure link with port 51, the encrypted traffic stored in memory 15 is sent back to JTAG logic 20. During transfer to probe 25, decision logic 54 would determine whether this previously encrypted traffic would bypass the encryption engine or whether it should be doubly encrypted.

Figure 5:
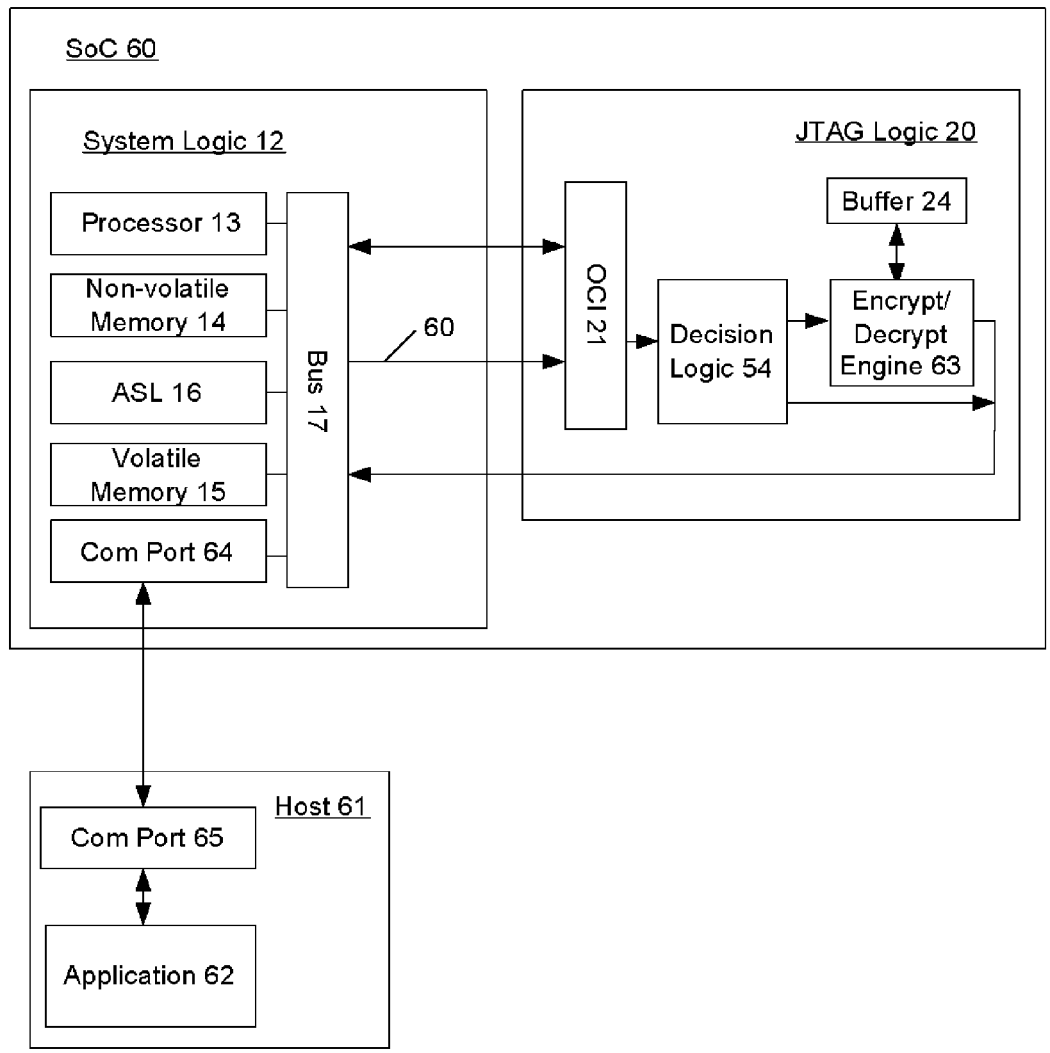
FIG. 5 is a block diagram illustrating a system for securing JTAG communications in an integrated circuit device that shares on-chip communication structure to minimize output pins in accordance with an embodiment of the present invention.

In FIG. 5, a probe-less embodiment of the present invention is illustrated. Since the traffic to and from SoC 60 is encrypted, it is possible to omit the probe and directly send the traffic to host 30 via a communication link such as the internet or other network. Host 61 includes application 62, which emulates the functions of a probe in addition to providing display and user interface functionality.

Traffic from SoC 60 to host 61 is encrypted by encryption/decryption engine 48 and then transferred to communication port 64. Communication port 64 provides the communication interface with to host 61. Port 64 may be a serial port such as a USB port, a network connection or a direct link. During the transfer of encrypted information from JTAG logic to the communication port 64, the encrypted traffic may be temporarily buffered in memory 15. When traffic received from host 61, it also may be buffered in memory 15 before it is decrypted by encryption/decryption engine 63.

Traffic transmitted between host 61 and communication port 64, in one embodiment, is collected at the transmitting end and enclosed in a wrapper that identifies the content as JTAG related. Computer code is executed at both the host and the SoC to receive and store the traffic in an accessible location for the receiving logic (hardware or software) and generating an interrupt to indicate receipt of the traffic. In one embodiment, communication port 64 includes a browser-like interface or API dedicated to handling on-chip communications with JTAG logic 20.

At host 61, encrypted traffic is received at communication port 65 where it is buffered, and then passed to application 61 for decryption and further processing. Support personnel can view received debug data or trace information on a web browser interface. To minimize transmission overhead, it is preferred that an AJAX browser interface be used at host 61 to interface with communication port 65. Thus, only information that changes needs to be transmitted from the SoC to the host, decrypted and displayed. Similar considerations control how control information is provided by host 61 to SoC 60.

Since communication port 64 is coupled to encryption/decryption engine 63, it is feasible to physically disconnect the on-chip JTAG test port after the device has been tested at the factory. The disconnect may be accomplished by blowing a fusible link between the test port and the rest of JTAG logic 20. Alternatively, test port 22 may be completely omitted from the JTAG logic 20 to save power and real estate in the device.

Figure 6:
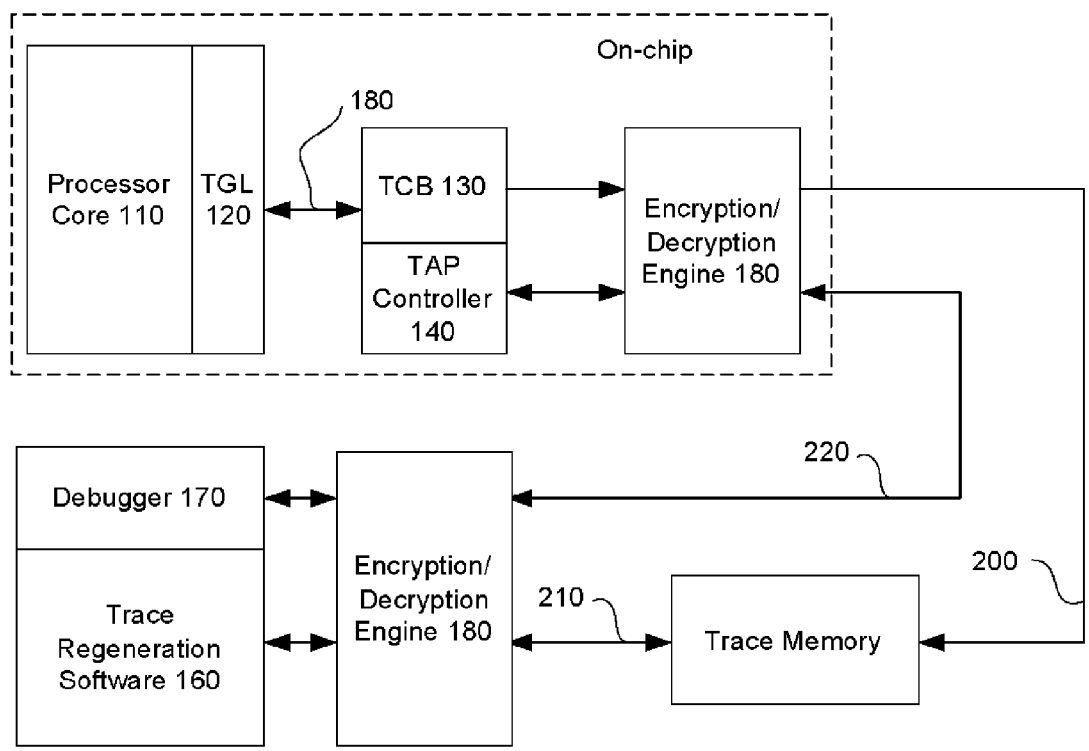
FIG. 6 is a block diagram illustrating another system for securing debug and trace communications in an electronic system in accordance with an embodiment of the present invention.

Refer now to the illustrated embodiment of FIG. 6 where tracing system 100 includes on-chip components identified as microprocessor core 110, trace generation logic (TGL) 120, trace control block (TCB) 130, and test access port (TAP) controller 140. TGL 120 can be embodied as part of microprocessor core 110. TGL 120 is generally operative to generate program counter (PC) and data trace information based on the execution of program code in one or more pipelines within microprocessor core 110. TGL 120 transmits the generated trace information to TCB 130 via trace interface 180. An embodiment of trace interface 180 is described in greater detail in U.S. Pat. No. 7,134,116 the disclosure of which is incorporated herein by reference for all purposes. This patent is assigned to MIPS Technologies, the assignee of the present application.

In the illustrated embodiment of FIG. 6, TCB 130 is located on-chip but is external to microprocessor core 110. TCB 130 captures the trace information provided by TGL 120 on trace interface 180 and writes the trace information to trace memory 150. The format used by TCB 130 in writing trace information to trace memory 150 is implementation dependent. However, before the trace information is written out to trace memory 150, it is encrypted by encryption/decryption engine 180. Thus, any information appearing on interface 200 or in trace memory 150 is encrypted rather than plain text.

As noted, trace memory 150 stores trace information received from TCB 130. In the illustrated embodiment, trace memory 150 is located off-chip. In an alternative embodiment, trace memory 150 is located on-chip and trace information is stored therein in plain text. Before exporting the trace information to the trace generation software 160, it is encrypted by encryption/decryption engine 180. The decision of where to locate trace memory 150 can be based on user requirements such as the desired size of trace memory 150 and the relative capture rate of trace information compared to the encryption rate of encryption/decryption engine 180. In yet another alternative embodiment, trace memory 150 is located on-chip and encrypted trace information is stored therein. Trace information exported to the trace generation software 160 in its encrypted form.

The trace information stored in trace memory 150 is retrieved through trace regeneration software 160. Note that trace regeneration software 160 is a post-processing software module that enables trace reconstruction. However, before trace regeneration software 160 can execute the instructions and process the data, encryption/decryption engine 190 must decrypt the traffic and recover plain text information.

It is a feature of the present invention that an on-chip TAP controller 140 is also included. TAP controller 140 includes instruction, data, and control registers as well as circuitry that enables tap controller 140 to access internal debug registers and to monitor and control the microprocessor core's address and data buses. In one embodiment, TAP controller 140 is based on the extended JTAG (EJTAG) specification developed by MIPS Technologies, Inc. However, before TAP controller 140 can execute the instructions and process the data, encryption/decryption engine 180 must decrypt the traffic and recover the plain text information that TAP controller 140 can recognize and operate on.

A debugger 170 is also implemented as a software module. Debugger 170 interfaces with TAP controller 140 and is generally operative to display TAP states as well as provide high-level commands to TAP controller 140. For example, debugger 170 can set breakpoints or examine contents of selected sections of on-chip memory. However, before TAP controller 140 can execute the instructions and process the data, encryption/decryption engine 180 must decrypt the traffic and recover plain text instructions and data.

In general, an inverted encryption/decryption scheme or a duplex approach for bi-directional encryption and decryption of JTAG traffic is preferred to allow secured loading from the JTAG port. The encrypted information can include both authentication of valid probe/target interface and encryption of debug data (trace as an example), so that the JTAG interface is only enabled for a probe that supports the proper JTAG protocol and has a correct encryption key. The encryption may alternately be handled as one encryption key for the on-chip to probe interface and a separate key for re-encrypting data from the probe to SW interface. Advantageously, the specific embodiments discussed herein are not necessarily limited to a particular manufacturing source of test probes.

In one preferred embodiment, substantially all exported JTAG data is encrypted using AES/DES or other public/private key protocol to prevent access to proprietary on-chip data. Block data is encrypted in a proprietary manner by interleaving information such as probe ID into the encryption key, to prevent access by unauthorized probes. For further protections, the probe itself and supporting software can be protected from unauthorized use by having a time based key that would need to be updated on a regular basis (daily, weekly by way of illustration). So even if a probe and target were stolen, the probe would only be useful for a limited duration of time. The key value can be of arbitrary length (for example, a 128 bit key for enabling the software on the probe), and is based on either or both the probe's embedded ID and the ID of the hard disk drive where the host software is installed Since the traffic across the interface is encrypted, even setting up a working JTAG channel to the device will not result in easily decodable data. When combined with a time-based, limited duration licensing key for the probe results in a debug or trace environment having a layered set of protections.

The above described embodiments of the present invention are readily incorporated in to a variety of SoC that include, for example, embedded instrumentation intellectual property such as MIPS processor instruments provided by FS2, a division of MIPS Technologies, Inc., 1225 Charleston Road, Mountain View, Calif. 94043-1353 ("MIPS Technologies"). These instruments provide tools for programming, testing, debug and trace of embedded systems in SoC, SOPC, FPGA, ASSP and ASIC devices. In one embodiment, the present invention comprises the functionality of an enhanced System Navigator probe having an encryption/decryption engine. The System Navigator probe, in a standard configuration without the encryption feature, is commercially available from FS2. One skilled in the art will appreciate that the present invention complements the features and functions provided by such standard configuration System Navigators by adding the security associated with encrypting debug data and trace information. Accordingly, the present invention, when combined with Bus Navigator, EJTAG and PDtrace tools, all commercially available from MIPS Technologies, adds encryption to these important and powerful tools that allows authorized users to access internal core operation and data while preventing unauthorized backdoor access. The present invention, when combined with on-chip instrumentation provides a protected means for system level debug in media-related and other applications where maintaining secured data has a high priority by plugging a JTAG security hole. Of course the present invention is not limited to MIPS on-chip instrumentation blocks such as EJTAG, PDtrace, and Bus Navigator. Rather, it will be appreciated that the present invention may also be used in conjunction with any JTAG, debug or trace solution.

Although the present invention and its objects, features, and advantages have been described in detail, other embodiments are encompassed by the invention. For example, when used as a debugging tool, an in-circuit emulator that uses JTAG as the transport mechanism enables a programmer to access an on-chip debug module which is integrated into the CPU via a secure JTAG communication channel.

Further, while the various embodiments described above provided for testing and debugging applications in an embedded system, one skilled in the art will appreciate that the present invention may be applied to testing and debugging printed circuit boards or integrated circuit sub-blocks, providing a convenient secured "back door" into the system that is locked to all but an authorized programmer.

Further still, although described in terms of JTAG, the present invention is also applicable to other implementation such as any of the commercially available extended or enhanced JTAG implementations, examples of which include a particular Extended Joint Test Access Group ("EJTAG") implementation developed by MIPS Technologies, which is an extension to the JTAG standard mentioned above. A complete discussion of the EJTAG implementation is described in EJTAG Specification, Document Number MD00047, Revision 2.60, dated Feb. 15, 2001, by MIPS Technologies (the "EJTAG Specification"), which is incorporated herein by reference in its entirety for all purposes.

In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Analog Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, paper, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core that is embodied in program code and may be transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An embedded system comprising:
    on-chip instrumentation comprising trace logic to provide trace information based on execution of program code in a microprocessor core in the embedded system;
    an access port for off-chip transfer of the trace information generated by the on-chip instrumentation via an external interface; and
    an encryption engine selectively disposed between the on-chip instrumentation and the access port wherein the encryption engine encrypts the trace information received from the on-chip instrumentation before transferring encrypted trace information to the access port, and wherein the encryption engine performs an additional encryption process to create double encrypted trace information.

2. A secure JTAG system for exporting information, the JTAG system comprising:
    JTAG logic comprising on-chip instrumentation to acquire traffic from device logic;
    an access port for off-chip transfer of debug information via an external interface to a host; and
    encryption logic, associated with the JTAG logic, to encrypt the acquired traffic in a first encryption pass and to encrypt the encrypted acquired traffic in a second encryption pass to create double encrypted traffic, wherein the first encryption pass employs a first encryption key and the second encryption pass employs a second encryption key.

3. The secure JTAG system of claim 2 wherein the first encryption key is associated with the JTAG logic.

4. The secure JTAG system of claim 2 further comprising logic to validate an interface between the JTAG system and a probe.

5. The secure JTAG system of claim 2 further comprising a probe operably linked to the JTAG logic to receive the double encrypted traffic.

6. The secure JTAG system of claim 5 wherein the probe comprises decryption logic to decrypt the double encrypted traffic.

7. The secure JTAG system of claim 6 further comprising a host operably linked to the probe to display the trace information in a human readable format.

8. The secure JTAG system of claim 5 further comprising a host operably linked to the probe and wherein the probe decrypts the double encrypted traffic using a first decryption key and the host decrypts the encrypted acquired traffic using a second decryption key.

9. The secure JTAG system of claim 8 wherein the first decryption key includes probe specific interleaved information.

10. A method, comprising:
authenticating a first interface between a probe and a host;
authenticating a second interface between the probe and debug logic incorporated in an embedded system, the debug logic comprising on-chip instrumentation to provide debug information;
exchanging encryption keys if the first and second interfaces are authenticated;
identifying outgoing traffic comprising the debug information generated by the debug logic to be transmitted to the host;
encrypting the outgoing traffic with a first encryption key to create encrypted outgoing traffic and encrypting the encrypted outgoing traffic with a second encryption key to create double encrypted traffic; and
transferring the double encrypted traffic from the debug logic to the probe.

11. The method of claim 10 further comprising transferring the double encrypted traffic from the probe to the host; and decrypting the double encrypted traffic and the encrypted outgoing traffic at the host.

12. The method of claim 10 wherein the second encryption key is probe specific.

13. The method of claim 10 further comprising decrypting the double encrypted traffic at the probe using a first decryption key associated with the second encryption key, transferring the encrypted outgoing traffic from the probe to the host, and decrypting the encrypted outgoing traffic at the host using a second decryption key associated with the first encryption key.

14. The method of claim 13 wherein the second encryption key is probe specific.

15. The method of claim 10 wherein the second interface comprises a JTAG test access port.

16. The method of claim 10 wherein the second interface comprises a trace port and wherein the debug information comprises trace information based on execution of program code in a microprocessor core in the embedded system.

17. A non-transitory computer readable storage medium, comprising executable instructions to cause an apparatus executing the instructions to perform the method comprising:
capturing debug data or trace information;
using on-chip instrumentation incorporated in an embedded system; and
utilizing an engine, interposed between the on-chip instrumentation and an external interface:
to encrypt, using a first encryption key, plain text traffic comprising the debug data or trace information received from the on-chip instrumentation to create encrypted information;
further to encrypt, using a second encryption key, the encrypted information to create double encrypted information, wherein the double encrypted information is transferred to the external interface; and
to decrypt encrypted inbound traffic received from the external interface before the inbound traffic is passed to the on-chip instrumentation, whereby instruction, data, and control register information received from the external interface is decrypted before use by the on-chip instrumentation.

18. The non-transitory computer readable storage medium of claim 17 further comprising executable instructions to disable the on-chip instrumentation.

19. The non-transitory computer readable storage medium of claim 17 further comprising executable instructions to cause the apparatus to authenticate a user prior to performing the method.

* * * * *